E. L. WATROUS.
DOLLY POST FOR WASHING MACHINES.
APPLICATION FILED FEB. 11, 1911.
1,134,302.
Patented Apr. 6, 1915.
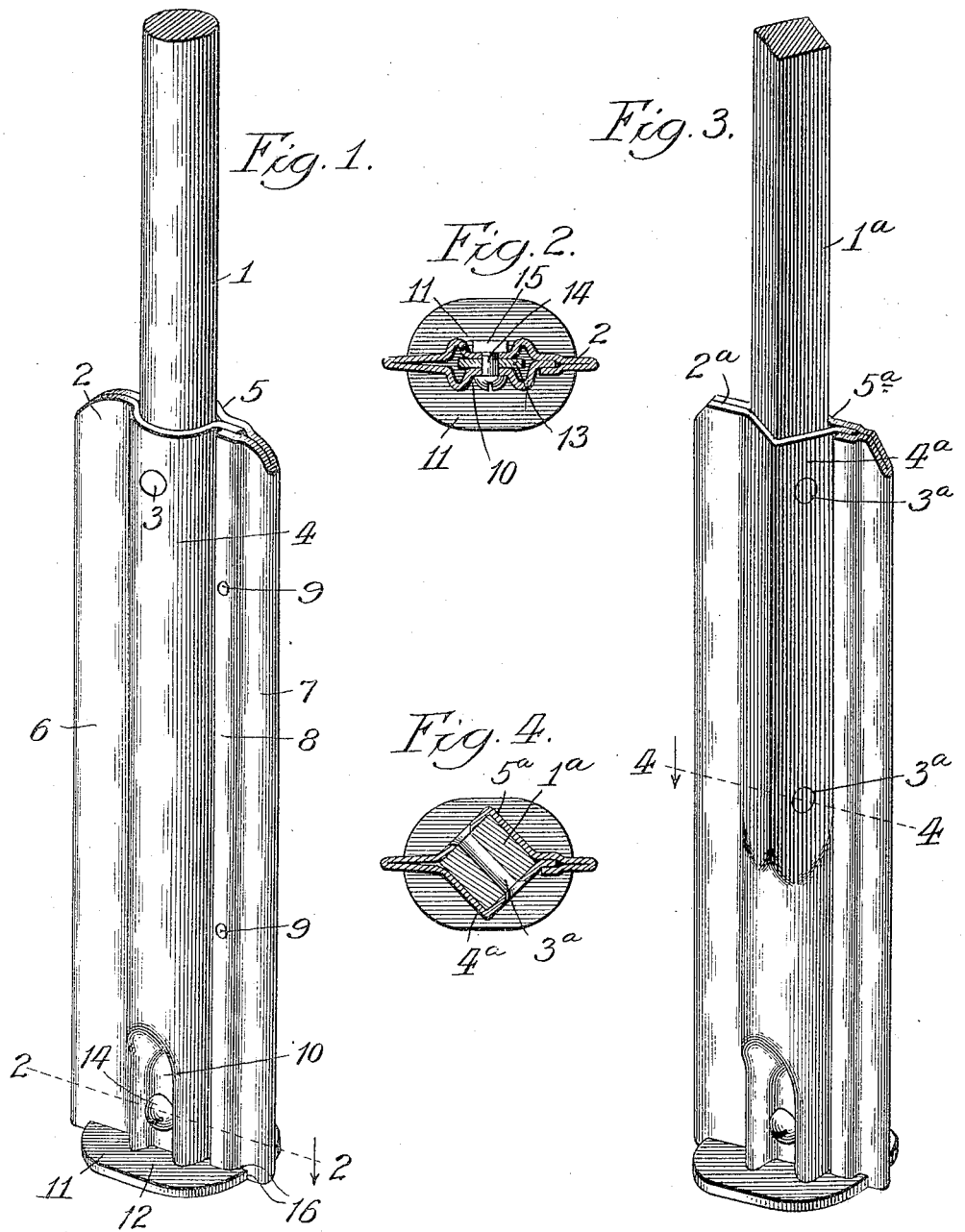
Witnesses:
John Enders
A. A. Thomas
Inventor:
Edward L. Watrous
by Wallace R. Lane, Atty.

UNITED STATES PATENT OFFICE.

EDWARD L. WATROUS, OF DES MOINES, IOWA, ASSIGNOR TO DAVID B. GANN, OF CHICAGO, ILLINOIS.

DOLLY-POST FOR WASHING-MACHINES.

1,134,302.    Specification of Letters Patent.    Patented Apr. 6, 1915.

Application filed February 11, 1911. Serial No. 608,163.

*To all whom it may concern:*

Be it known that I, EDWARD L. WATROUS, a citizen of the United States, residing at Des Moines, Polk county, Iowa, have invented a new and Improved Dolly-Post for Washing-Machines, of which the following is a specification.

The object of my invention is to provide an all-metal dolly post for supporting the dolly in the tub of a washing machine, the dolly being prevented from rotating with respect to the post, but capable of sliding up and down on the post.

Broadly considered, the dolly post of my invention comprises a steel or cast iron shaft to which is rigidly secured, as by riveting, a body of sheet metal.

The advantages of my invention will become apparent from a detailed description of the accompanying drawings in which—

Figure 1 is a perspective view of one form of my improved dolly post; Fig. 2 is a cross-section view on line 2—2 of Fig. 1, looking in the direction indicated by the arrow; Fig. 3 is a perspective view of a modified form of my invention showing a square shaft on the dolly post; and Fig. 4 is a cross-section view on line 4—4 of Fig. 3.

Referring first to the form shown in Figs. 1 and 2, it will be seen that the dolly post comprises a shaft 1 to which is rigidly secured the body 2 of sheet metal. One or more rivets 3, or similar suitable fastening devices, pass through the parts 1 and 2 for securely holding them together. The sheet metal body 2 is formed with outwardly bulging central portions 4 and 5 and a pair of laterally extending ribs 6 and 7. The center portions 4 and 5 combine to form an opening into which the shaft 1 extends. In the rib 7 the body of the metal is folded back so as to present a treble thickness indicated by 8. If desired, fastening devices such as rivets 9 may be passed through this treble thickness for securely holding the ends of the sheet metal together. The body 2 is at its lower end provided with depressions 10 and 11. The button 12 is provided with an extension 13 which projects upwardly between the inner walls of the recesses 10 and 11. A bolt 14, or similar removable fastening device, passes through alined openings in the walls of the recesses 10 and 11 and the extension 13 for securely holding the button 12 in place on the free or lower end of the body of the dolly post. The nut 15 carried by the bolt 14 rests in the recess 11 and is thus prevented from turning loose. The lower end of the body 2 is preferably counter-sunk as indicated at 16 to receive the button 12 so that the latter will be flush with the end of the post.

The modification shown in Figs. 3 and 4 differs from the form above described in that the shaft $1^a$ is square. The center portions $4^a$ and $5^a$ of the sheet metal body $2^a$ are shaped angularly so as to receive the angular shaft. Rivets, or similar fastening devices $3^a$, pass through the square shaft $1^a$ and the sheet metal body $2^a$ for firmly holding the parts together. Otherwise the construction of the body $2^a$ is like that of the previously described body 2 and no further description of Figs. 3 and 4 is, therefore, necessary.

I have not deemed it necessary, to an understanding of my invention to either illustrate or describe a washing machine or a dolly head in connection with which my new form of dolly post is intended and adapted to be used, since such details are well understood by those skilled in the art. It is obvious that a dolly of any suitable construction may be provided on my new form of dolly post. The removable button 12 permits the dolly to be readily slipped in place and as readily withdrawn. The iron of the dolly post will preferably be galvanized so as to prevent rusting. It will be seen that I have provided an exceedingly simple construction, durable and light in weight.

Having thus described my invention what I claim as new and desire to secure by Letters Patent of the United States is:

1. A dolly post having an aperture in its lower end and being longitudinally recessed, a button at the lower end of the post and having a tongue extending into the aperture, and a bolt set through the post and tongue, its ends being housed within the recesses.

2. A dolly post apertured at and transversely channeled across its lower end and having longitudinal recesses, a button positioned within the channel and having a tongue projecting into the aperture, and a bolt set through the post and the tongue, the bolt ends being housed within the recesses.

In witness whereof, I hereunto subscribe my name, this 12th day of January, 1911.

EDWARD L. WATROUS.

In the presence of—
CLARENCE J. LOFTUS,
ELIZABETH SKAHILL.

Copies of this patent may be obtained for five cents each, by addressing the "Commissioner of Patents. Washington, D. C."